Aug. 22, 1950        R. C. JIMÉNEZ        2,519,578
AUTOMATIC RELIEF VALVE
Filed Jan. 26, 1946
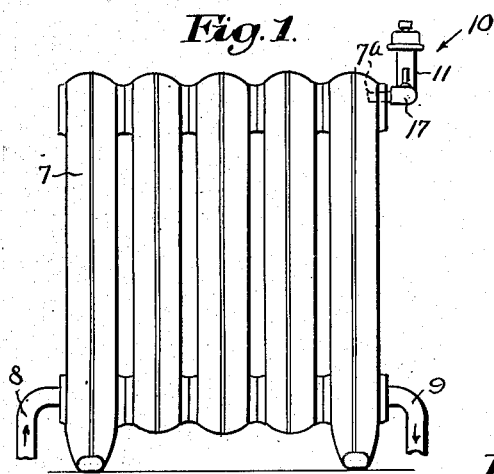
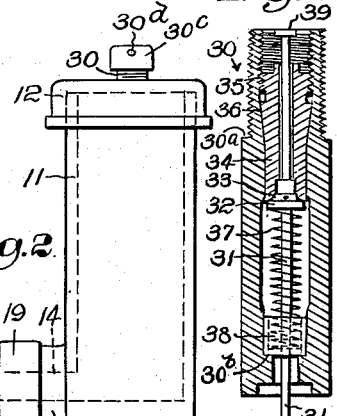
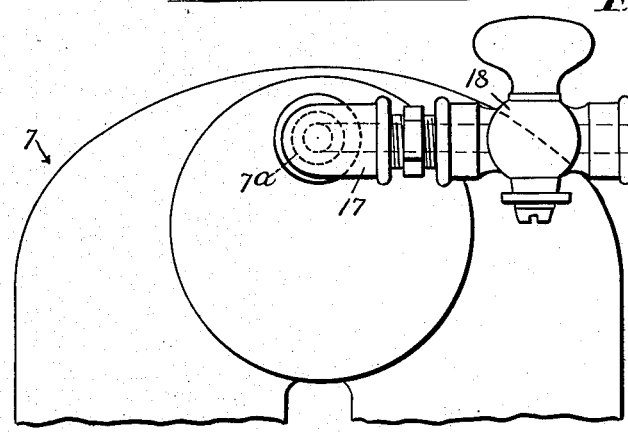
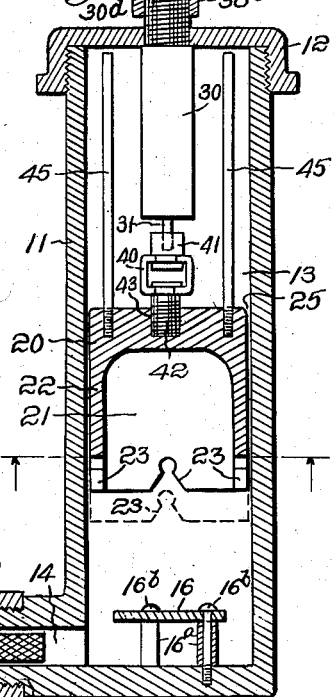
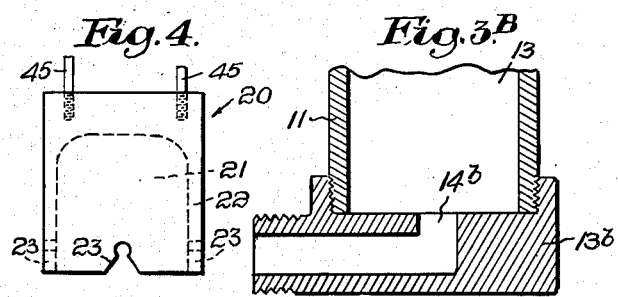
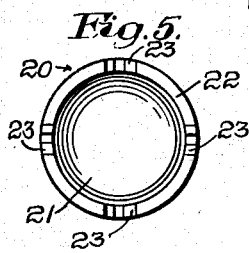
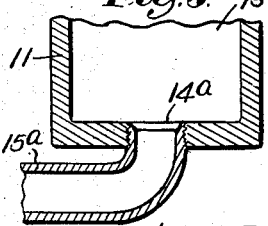
Inventor:
Ramón Castro Jiménez
by Emery, Booth, Townsend, Miller & Weidner
Attys Patented Aug. 22, 1950

2,519,578

UNITED STATES PATENT OFFICE 2,519,578

AUTOMATIC RELIEF VALVE

Ramón Castro Jiménez, Winthrop, Mass.

Application January 26, 1946, Serial No. 643,638

4 Claims. (Cl. 137—122)

My present invention relates to relief valves for fluids, particularly gaseous fluids such as accumulations of air pocketed in chambers, conduits and the like. While the novel means of the invention is variously applicable for automatic venting and relief purposes, it is especially suited for use in connection with radiators of hot-water heating systems.

In the drawings illustrating by way of example one embodiment of the invention:

Fig. 1 shows my automatic relief valve installed on a hot-water radiator;

Fig. 2 is an end elevation of such radiator and valve, on a larger scale;

Fig. 3 is a vertical section through the valve device as a whole, on a still larger scale;

Figs. 3A and 3B corresponding to the lower portion of Fig. 3, show modifications;

Figs. 4 and 5 show the piston element separately, in side elevation and bottom plan respectively; and Fig. 6 is a detail sectional view of the valve element proper.

Referring now to Figs. 1 and 2 of the drawings, these represent a conventional hot-water radiator 7 having water inlet and outlet piping connections as at 8 and 9. The automatic relief valve unit of the invention, indicated generally by the numeral 10, is shown installed at the top of an end coil of the radiator, as at the tapped aperture 7a usually occupied by a closure plug or some manual valve or cock. This valve unit 10 comprises a tubular body or shell 11 having a top opening and there threaded to receive a pressure-tight closure cap 12; see also Fig. 3. The interior of the shell 11 provides a piston and valve chamber 13 having at the bottom a port 14 for communication with the interior of the radiator.

Such port may be formed in a threaded boss 15 at the base of the shell 11 and adapted for direct reception in the mentioned radiator aperture such as 7a. In the example of Fig. 3 the port 14 opens laterally at the base of the shell, and the chamber 13 extends to the bottom level of the port. In other instances the port may open vertically at the bottom of the chamber, as at 14a, Fig. 3A, the body there having an elbow or other piping connection as at 15a; or the body port may be incorporated as at 14b, Fig. 3B, in a removable bottom closure 13b having threaded and sealed connection with the open lower end of the body. Within the invention any preferred port construction and arrangement may be employed for ingress and egress of fluid at the base of the valve and piston chamber 13. If desired, particularly for installations where the radiation water pressure is relatively high, as for example 75 or more p. s. i., a distributor or baffle plate 16 may be provided above the port, of less diameter than the chamber and peripherally spaced for circumferentially uniform passage of fluid. Such plate may be supported in any convenient manner as by spacers 16a positioned by anchor screws 16b engaging the shell base. The space between the latter and the baffle is in effect a portion of the total chamber 13.

In the illustrative example of Fig. 2 the radiator connections of the unit include an elbow 17 coupled to the radiator and to one side of a shut-off cock 18 interposed between the radiator and the relief valve body 11. A coupling 19 between the cock 18 and the valve body desirably includes a screen of a thimble or other form, such as indicated at 19a, Fig. 3. A shut-off device such as 18 facilitates opening or removal of the automatic valve unit 10 for inspection, screen cleaning and other purposes. The elbow coupling as in Figs. 1 and 2 offset the valve unit into less prominent location at the back of the radiator. The particular positioning of the valve at the top of the radiator is largely a matter of preference and as previously noted the threaded boss or nipple 15 of the unit may be directly received in the radiator aperture 7a.

Considering now more particularly Figs. 3 to 6, the shell 11 and chamber 13 therein primarily present an operating cylinder for a valve-controlling piston or valve controller 20 movable in this cylinder. The piston 20 comprises a body of a cross-sectional size and shape conforming it to a lateral wall of the piston chamber with a calculated definite but limited clearance. This lateral spacing is dimensioned to afford an annular channel 25 between the piston and the cylinder wall, providing a passage for escape of air from the radiator, and for admitting air thereto in draining the radiator, as will be more fully explained. In the average unit suitable for hot-water radiators an appropriate value for this lateral spacing about the piston is found to be of the restricted or substantially capillary order of about .002 to .006 in., that is, a difference of about .004 to .012 in. between the piston O. D. and the shell I. D., depending somewhat upon the normal expected operating pressure of the liquid. It will be understood that the cylinder shell 11 is of a rigid material, such as 16 ga. steel or other metal or alloy not readily subject to deformation. All parts subject to water or moisture preferably are of a non-corrosive or rust-resisting composition.

The bottom wall of the piston 20 is formed with a centrally disposed and symmetrical concavity 21, giving the piston an inverted cup-like form at its lower portion, including a relatively thin-walled pendent skirt 22 substantially as illustrated, Figs. 3 and 4. The lower margin of this skirt has a plurality of small openings or slots equally spaced circumferentially. Four such slots are indicated at 23 in the illustrative example; see particularly Figs. 4 and 5, showing the piston element separately. The slots may be variously shaped, but preferably are flared downwardly from a narrowed intermediate portion above which they have a slight rounded or other enlargement at the top level, substantially as shown. The skirt apertures 23 provide radial port means into the cavity 21 in the valve controller or piston 20 and there define an intermediate locking or trapping level for air above the port means in the cavity.

The air-relieving valve proper is centrally disposed on the top wall or cap 12 of the unit. It comprises a tubular housing or sleeve 30 held in and extending through a central aperture in the cap 12. As shown in Figs. 3 and 6 the upper end of the housing sleeve 30 is threaded into the cap from the inside and is reduced to form a shoulder as at 30a for sealing abutment with the inner wall of the cap. The sleeve 30 houses a spring-loaded valve adapted for opening a through passage to the atmosphere against the spring pressure. That is, in normal position as when the radiator is filled with water, the valve is closed and the spring loading is in a direction to effect such closure. To relieve any accumulating air this valve automatically opens against the spring pressure, in response to down movement of the piston 20, as will be more fully explained, the opening action being downward in the illustrated example. When the valve is open air may pass through the central passage from end to end of the sleeve 30.

As best seen separately in Fig. 6, the valve is represented as generally similar to a Shrader air valve for vehicle tires. It comprises a central stem 31 having fixed on it an annular valve head or disc 32 of smaller diameter than the central bore of the sleeve 30 so as to provide for air passage past the valve disc when open and adapted to close, upwardly in this instance, against a seat 33 at the adjacent end of a valve sleeve 34 removably threaded as at 35 into the housing sleeve 30 and having sealing engagement therewith as at 36. The under face of the valve disc 32 is adapted to receive closure-assisting air pressure. A light coil spring 37 surrounds the valve stem 31 below the valve disc 32, thrusting between the latter and a centrally apertured bearing cup 38 loosely surrounding the stem so as to provide an annular air passage between them. An internal annular shoulder 30b near the lower end of the housing sleeve 30 forms a supporting stop for the bearing cup 38 and the coil spring seated within it. Down movement of the valve and its stem desirably is limited as by a head 39 at the upper end of the stem 31. The latter is smaller in cross section than the longitudinal opening through valve-seating sleeve 34, as clearly seen in Fig. 6. Thus when the valve disc 32 is moved down from the elevated closed position against its seat 33 shown in Fig. 6 a channel for air is opened completely through the housing sleeve 30. A removable protective cover or dust cap 30c having one or more air vents as at 30d desirably is fitted over the outer end of the valve housing 30.

Referring particularly to Fig. 3, the valve stem 31 is extended at the lower end of the housing sleeve 30. Its lower end is movably coupled with the piston 20 by means of a flexible linkage such as to avoid direct engagement of the piston and the valve stem, and adapted to maintain axial parallelism of the piston and the valve stem regardless of possible variations of the valve device as a whole from the vertical, said flexible connection also minimizing any chance for deforming or misaligning effect upon the valve stem. In the illustrated example the connection includes a swivel ring 40 rotatably carried in a footpiece 41 threaded or otherwise mounted at the lower end of the valve stem 31. An opposite portion of the ring 40 is in turn swivelled in a connector plug 42 centrally tapped into the top of the piston 20 as at 43. To insure against overthrust by the piston against the valve stem 31, beyond the normal full-closed valve position of Fig. 6, up limiting means desirably is provided, such as one or more symmetrically disposed stop pins 45, 45, Figs. 3 and 4, fixed at the top of the piston and adapted to abut the chamber top wall 12 in the event of upward overthrow of the piston beyond the level substantially as shown in Fig. 3, at which the valve has been relieved of the piston load and permitted to be closed by its spring. Hence no undue pressure on the valve stem and its connections with the piston can occur, such as might tend to rupture or deform them.

In Fig. 3 the controller 20 is shown in full line in the closed or up position, while the open or down position is indicated by the dotted lines. The horizontal broken line with associated arrows indicates the critical level as to presence or absence of liquid, and at which air is trapped or locked in the controller cavity 21. As stated, the mass and weight of the controller are such that the average density is markedly greater than that of the liquid, such as water of a radiation system. If freed from the flexible suspension and released in a body of water the controller 20 promptly sinks, either with or without air in cavity 21. While air trapped in the cavity in effect subtracts from the weight of the controller in water and in this sense is a buoying force, the controller remains distinctly heavier than the water displaced by it, and sinks therein. Hence the controller 20 is not a float in the usual sense of being borne at or partly above the surface of a liquid. It is true however that the variation in total effective weight of the controller with change in the proportions of air and liquid in the shell 11 is a factor in the operation. The net gravitational down force of the controller is less in water than in air, and in water is less with air locked in cavity 21 than if the cavity were occupied by water. Nevertheless my controller at a final stage of closure of the valve does become submerged by liquid finally passing above it, unlike the action of a float.

In operation, assume that the valve 32 is open, having been pulled down against the spring by descent of the controller 20 to the dotted position of Fig. 3, water being absent below the latter. As water under gravity or other pressure returns and rises from the inlet-outlet port 14 at the bottom of shell 11, air ahead of the water passes up through the restricted annular passage 25 between the controller 20 and the shell and out to atmosphere past the open valve 32. On arrival of water up to the port-closing line marked by the arrows in Fig. 3 air is trapped in the cavity 21. Passage of water upwardly past the piston or controller 20 is resisted and retarded by the temporarily sealing or restricting annular passage 25. Under this condition of up force of the water, the piston or controller 20 abruptly rises to the full-line position of Fig. 3 and valve 32 is closed by the spring.

When now the water finally rises above the controller piston 20, after the closing of valve 32, and reaches a static condition, the water pressure becomes balanced above and below the piston, balancing the upward liquid pressure at the bottom of the piston. As noted, the piston is designed to be heavier than water, even with air in the cavity, and hence in this submerged and static pressure condition would sink were it not for the spring 37, any upward fluid pressure on the valve 32, and any cohesive-adhesive effects in the annular passage 25. Not until the water recedes in the shell 11 to a point near or below the arrow line of Fig. 3 does the piston 20 in effect become heavy enough to overbalance the spring and other up forces and accordingly drop to open the valve. Thus buoyancy in the sense of weight decrease (as contrasted with floatation), fluid pressure, air compression and constrictive liquid flow retardation all play parts in the operation of the piston or controller 20. The action is automatic throughout each cycle of valve opening and closing.

My invention is not limited to the particular embodiment thereof illustrated and described herein, and I set forth its scope in my following claims:

1. An automatic air relief device for radiators containing a liquid heating medium, said device comprising, in combination, an upright tubular cylinder closed at the top and bottom, an inlet-outlet port at the lower end of the cylinder, an air-venting valve at the upper end of the cylinder adapted for opening to atmosphere, spring means loading the valve in the closing direction, a piston movable between valve-closed up position and valve-open down position and having an air-trapping cavity in its bottom, said piston being so spaced from the cylinder as to form a calculated capillary air-passing and liquid retarding clearance between them, and suspensive connecting means between the top of the piston and the valve, the piston having such markedly heavier-than-the-liquid weight as to move to valve-open down position against the valve spring means in the event of falling liquid level and accumulation of air below the piston, and also such that on return rise of the liquid with attendant trapping of air in the cavity and retarding of liquid in the capillary clearance the piston is forced up and the valve permitted to be closed by the spring means before liquid can escape thereat.

2. In an air relief valve, a vertical cylindrical shell having closing top and bottom walls, an air venting valve on the top wall openable downwardly and spring loaded in the closing direction, a liquid inlet-outlet port at the lower end of the shell, a cylindrical piston in and closely laterally spaced from and conformed to the shell to provide a predetermined capillary air-passing and liquid-retarding annular channel between them, the piston having a downwardly open bottom cavity surrounded by a skirt with radial ports at a level of the cavity spaced below the top thereof communicating between the cavity and said channel, and a flexible suspending connection between the top of the piston and the valve.

3. An automatic air-relief valve comprising a tubular valve housing containing a valve seat, a valve thereat having a stem for opening it downwardly, and a spring loading the valve in the up closing direction, in combination with a shell defining a vertical cylindrical chamber having top and bottom walls with the valve housing centrally supported by the top wall and providing communication between the shell chamber and atmosphere, the chamber having an entrance-exit port at the lower end, and a cylindrical piston-like weighted valve controller vertically movable in the chamber in close guided conformance to the chamber wall to provide thereat a restrictive annular capillary passage surrounding the controller, the latter having a solid upper part and a pendant hollow skirt defining a concentric symmetrical cavity open at the controller bottom having radial port means defining a locking level for air in the cavity at an intermediate position between the ends thereof, the controller having a flexible connection with the valve stem whereby it is hung thereon and having a heavier-than-the-liquid weight adapting it to descend and open the valve against the spring and any opposing cohesive-adhesive action of the liquid at the annular passage around the controller thereby to open the valve in the absence of liquid rising in the chamber to said air-locking level of the controller, the weight excess of the controller over the net effective up-loading force of the spring in such liquid-absent status being such that arrival of liquid and attendant locking of air in the controller cavity above said locking level in effect negatives said weight excess and causes spring-relieving up force on the controller to permit closure of the valve by the spring prior to travel of liquid to the vicinity of the valve.

4. An automatic air-relief valve according to claim 3 wherein the annular passage around the controller has a radial dimension of the order of about .002 to .006 in.

RAMÓN CASTRO JIMÉNEZ.

REFERENCES CITED

The following references are of record in the file of this patent:

UNITED STATES PATENTS

| Number | Name | Date |
|---|---|---|
| 352,093 | Kupferle | Nov. 2, 1886 |
| 649,519 | Kinnison | May 15, 1900 |
| 721,521 | Luethesser | Feb. 24, 1903 |
| 725,640 | Wemmer | Apr. 14, 1903 |
| 1,166,439 | Corbin | Jan. 4, 1916 |
| 1,667,877 | Star | May 1, 1928 |
| 1,963,867 | Robisch | June 19, 1934 |
| 2,046,228 | Wiedmann | June 30, 1936 |
| 2,104,039 | Hunter | Jan. 4, 1938 |
| 2,251,086 | Van Dyke | July 29, 1941 |
| 2,276,136 | Woolley | Mar. 10, 1942 |
| 2,331,431 | Simoneau | Oct. 12, 1943 |

FOREIGN PATENTS

| Number | Country | Date |
|---|---|---|
| 2,845 | Great Britain | Feb. 3, 1914 |